Oct. 11, 1966  J. K. SHANNON  3,278,669
METHOD OF UNITING BATTERY COVER AND CASE
Filed Feb. 1, 1963  2 Sheets-Sheet 1
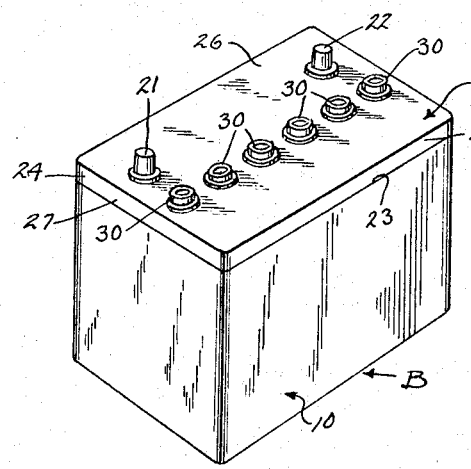
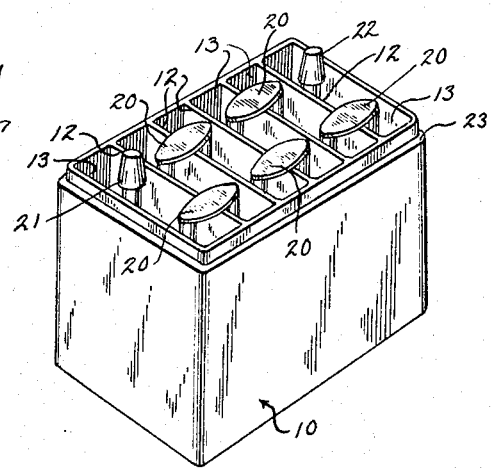
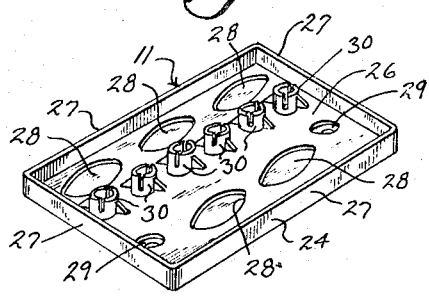
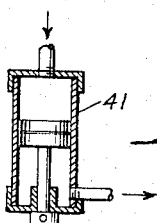
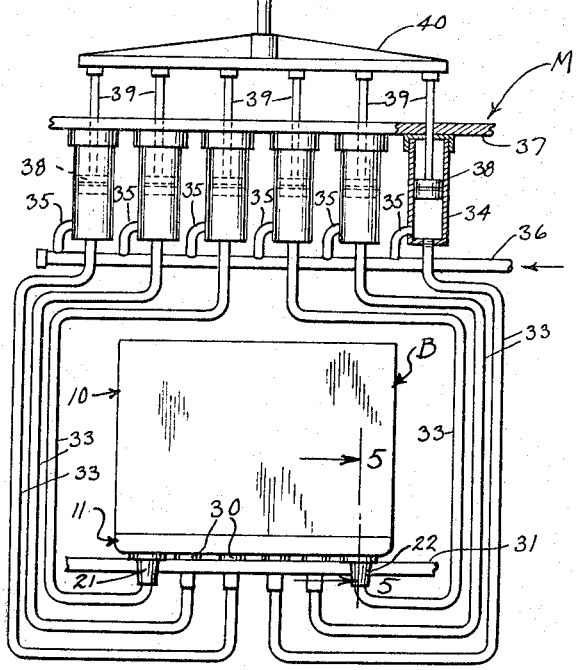
INVENTOR
JOHN K. SHANNON
BY *Wright &Wright*
ATTORNEYS Oct. 11, 1966  J. K. SHANNON  3,278,669
METHOD OF UNITING BATTERY COVER AND CASE
Filed Feb. 1, 1963  2 Sheets-Sheet 2
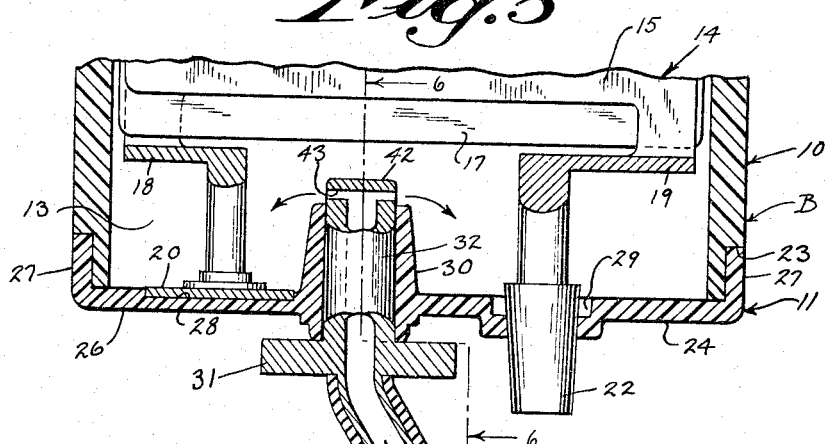
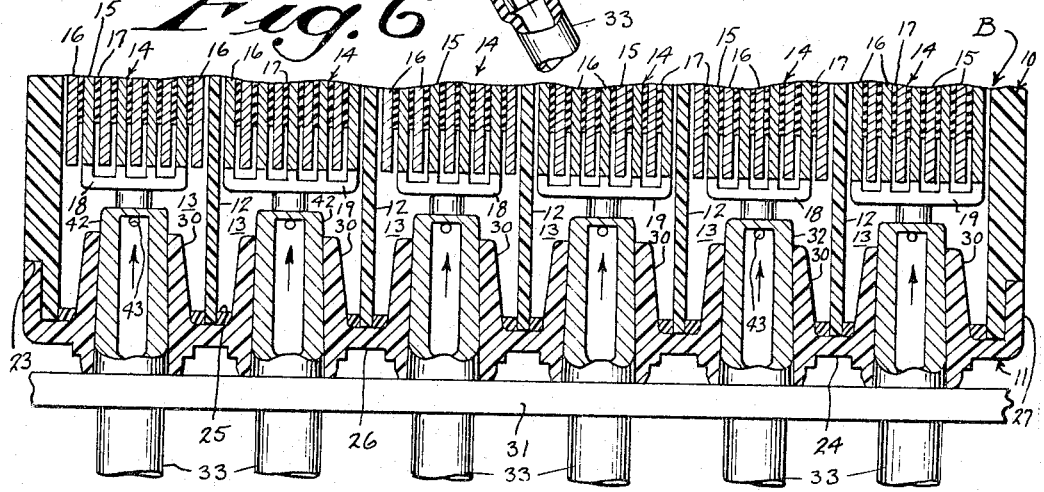
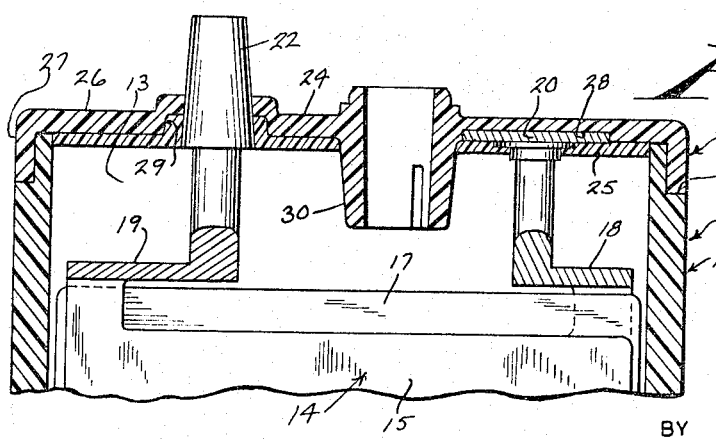
INVENTOR
JOHN K. SHANNON
BY
*Wright & Wright*
ATTORNEYS р
United States Patent Office 3,278,669
Patented Oct. 11, 1966

3,278,669
METHOD OF UNITING BATTERY
COVER AND CASE
John K. Shannon, 2028 63rd Place, Kenosha, Wis.
Filed Feb. 1, 1963, Ser. No. 255,638
4 Claims. (Cl. 264—263)

This invention appertains to a novel method of forming storage battery covers and uniting the same with storage battery cases or containers, and cell plate assemblies to form a substantially integral one-piece unit, and is an improvement over my pending applications Serial Nos. 90,487 and 177,312 filed respectively February 20, 1961 and March 5, 1962 now Patent No. 3,194,687.

In my pending applications, I provided a finished pre-molded thin walled outer cover section, which was utilized as a mold tray during the assembling of the battery and the molding of an inner cover section with the outer section and the case or container to form a bonded cover and container. During the molding of the inner cover section, the material enveloped the connector or jump straps to aid in insulating the same and to form a support therefor. In this form of my invention, the outer pre-molded cover section was inverted to provide the mold tray and the plate cell groups with their connector or jump straps were placed on the tray in an upright position. The free flowing plastic material for the inner cover section was then poured into the tray to a desired level to envelop the jump straps etc., after which the case or container was slipped over the plate cell groups and into the plastic material and into the tray. Upon the solidfying of the plastic material, the same united with the material of the tray or outer cover section and with the material of the container or case to form a homogeneous whole.

Difficulty was encountered in placing the plate cell groups in an upright position on the tray and the slipping of the case or container over the plate cell groups in that the plate cell groups tend to tilt and in many instances, the cell plate groups fitted rather tight in the case and a binding action occurred, resulting in some instances in plate deformation.

It is therefore one of the prime objects of my present invention to first assemble the cell groups in the container or case and then place the outer pre-molded cover section in correct position on the case or container and in engagement with the connector or cell jump straps, and thereafter to invert the entire battery. With the battery in its inverted position, the material for the inner cover in its free flowing condition is then injected in an exact, measured, predetermined quantity into the tray for each cell. After the solidfying of the material and bonding thereof with the cover and case or container, the complete battery is then turned to its normal upright position. The new steps of the assembling result in a quick and efficient method of making the battery and without the use of an excessive quantity of the plastic material.

Another prime object of the invention is the provision of a method utilizing a novel means for injecting the material for the inner cover section into the tray or outer cover section, which consists in the use of nipples introduced into the filling openings for the cells and of a length greater than the length of the walls of the filling openings and, forcing a measured quantity of material for each cell through the nipples and into the tray.

A further prime object of the invention is to provide a close fit between the nipples and walls of the filling openings, whereby the creeping of the material between the walls of the openings and nipples will be prevented, and whereby upon the withdrawing of the nipples from the openings, a wiping action will be had on the nipples by the inner edges of the walls of the filling openings.

A further important object of my invention is the provision of a method utilizing injection nipples having closed upper ends and with outlet injection openings on the sides thereof, so that upon the forcible injection of the material into the tray through the nipples such material will not be forced into cell plate groups and in contradistinction thereto will flow down the sides of the filling openings and directly into the tray.

A still further prime object of my invention is the provision of a method utilizing means for injecting plastic material in a free flowing condition into the tray with an exact, measured quantity of material for each battery cell, with one single operation.

With these and other objects in view, the invention consists in the novel construction, arrangement and formation of parts, as will be hereinafter more specifically described and claimed, and illustrated in the accompanying drawings, in which drawings:

FIGURE 1 is a perspective view showing my complete battery;

FIGURE 2 is a perspective view showing the cell plate groups with their connector or jump straps disposed in the battery case;

FIGURE 3 is a perspective view of the pre-molded outer cover section in an inverted position;

FIGURE 4 is a side elevational view partly in section showing the pre-molded outer cover section on the battery case and covering the cell plate assemblies and with the battery in its inverted position on an injection machine, the view being of a diagrammatic nature;

FIGURE 5 is an enlarged detail transverse section view taken on the line 5—5 of FIGURE 4, looking in the direction of the arrows and showing an injection nipple correctly positioned in the filling opening of a battery cell;

FIGURE 6 is a fragmentary longitudinal section view taken on the line 6—6 of FIGURE 5, looking in the direction of the arrows and showing the injection nipples in position and with the plastic material for the inner cover section forced into the tray or cover section, and FIGURE 7 is a view similar to FIGURE 5, but showing the completed battery and in its correct upright position with the plastic material bonded to the outer cover section and the battery case and enveloping and enclosing the connector or jump straps for cell plate groups.

Referring to the drawings in detail, wherein similar reference characters designate corresponding parts throughout the several views, the letter B generally indicates a storage battery constructed in accordance with the novel features of this invention. As illustrated, the battery B includes a pre-molded case or container 10 and the cover 11. The case or container 10 is divided by spaced transverse partitions 12 into independent cells 13. I have shown a battery with six cells, but it is to be understood that the battery can be of any size or type, and of any desired number of cells. The cells 13 receive the cell plate groups or assemblies 14 consisting of the usual alternately arranged positive and negative plates 15 and 16 and spacers 17. The positive plates of each group are connected by straps 18 and the negative plates are connected by straps 19. The positive set of plates of one cell are electrically connected to the negative set of plates of an adjacent cell by jump or connector straps 20. It is to be noted that the connector or jump straps 20 are of the thin, flat, oval shape and extend across the cell partition walls 12. The end cells of the battery are provided with terminal posts 21 and 22. The terminal post 21 is carried by and electrically connected with a positive set of plates while the terminal post 22 is carried by and electrically connected with a negative set of plates. The terminal posts 21 and 22 project a material distance beyond the battery case or container.

The battery case or container 10 can be molded from hard rubber or any other preferred type of plastic material and is of substantially the same type and character as now employed in storage batteries on the market. While I have stated that the case 10 is of substantially the same character as that employed in storage batteries now, it is to be understood that the upper edge of the battery case or container together with the partition walls 12 are formed in such a way as to insure the proper molding and positioning of the cover 11 thereon, so that the cover and case will be correctly united to form a substantially homogeneous unit. Thus, the outer upper edges of the walls of the case or container are reduced in thickness to provide a peripheral shoulder or seat 23. The seat is shown on the exterior of the case or container, but it is to be understood that this seat could be formed on the inner face of the battery case or container.

In accordance with my invention, the cover 11 is formed from an outer pre-molded, finished cover section 24 and an inner cover section 25 which is formed during the construction and assembly of the battery. The outer pre-molded cover section 24 includes a substantially flat outer or top wall 26 and depending peripheral flanges 27. Thus, this outer section 24 when in an inverted position as shown in FIGURE 3, forms a tray for the reception of the material which is utilized to form the inner cover section 25. The inner face of the top wall 26 is provided with seats or depressions 28 of a size and depth to snugly receive the connector or jump straps 20 when the cover is being united with the case or container. The top wall 26 is provided adjacent to its opposite ends with openings 29 for receiving the terminal post 21 and post 22 of the battery. The wall 26 also has formed on its inner surface inwardly projecting sleeves 30. These sleeves 30 open out through the cover and form vent and filling openings for the individual battery cells, and these vents and filling openings are normally closed by removable caps, not shown. I provide the sleeves 30 on the cover section 24 for a definite purpose, which will appear as the invention is further set forth.

In accordance with my present invention, the battery case or container is initially disposed in an upright position, as shown in FIGURE 2, and the connected cell groups of battery plates 14 are slid into their proper cells, with the connector or jump straps 20 lying across the partitions 12 and preferably in engagement therewith. The cover tray section 24 is now placed on the case with the flanges or skirts 27 fitted on the shoulder 23. The connector or jump straps 20 fit snugly within the recesses 28 and these jump straps have a thickness substantially equal to the depth of the depressions 28. Thus the inner surface of the cover tray section 24 will fit down over and engage the upper edges of the cell partitions 12. The battery is now ready to receive the material for the inner cover section 25 and this material is forcibly injected into the battery by an injection machine M shown in FIGURE 4. While the injection machine M can take various forms the same must be devised to give an equal and predetermined quantity of the plastic material into the outer cover tray section 24 for each cell. The machine in the present instance has been shown diagrammatically, and can include a bed or frame plate 31 carrying a plurality of upstanding injection nipples or nozzles 32. These nipples or nozzles 32 are equidistantly spaced and spaced an exact distance apart for free entry into the filling and vent openings and their sleeves 30. Each nipple has connected thereto a hose or pipe 33 and each hose or pipe leads to an independent injection cylinder 34. Each cylinder 34 is connected by a branch pipe 35 with a manifold 36 which leads to the source of supply of the plastic material and the plastic material is maintained in a free flowing condition. Each cylinder 34 is rigidly mounted on a frame bar 37 and reciprocally mounted in each cylinder is a force piston 38. The pistons 38 are connected by rods 39 to a common cross head 40. The cross head can be reciprocated up and down a desired distance in any manner, such as through the use of a fluid operated cylinder 41. By this construction, it can be seen that all of the injection pistons are operated simultaneously and move an exact equal distance. Obviously, on the upstroke of the pistons 38 the fluid plastic material is sucked into the cylinders 34 in an exact quantity and on the downstroke of the pistons 38, this exact quantity of material is forced through each nipple or nozzle 32.

The nipples or nozzles 32 are of a novel and special construction and each nipple fits snugly within its sleeve 30 and is of a length to extend inwardly beyond the sleeve.

With the battery assembled, the same is turned to an inverted position as shown in FIGURE 4, and placed on the machine with the nipples or nozzles 32 extending through the sleeves 30 and this is best shown in FIGURE 6.

Now referring to the specially designed nipples 32, it can be seen that the same extend into the battery beyond the sleeves 30 and that the outer ends thereof are closed by end walls 42, and that the sides are provided with outlet ports 43. With the downward movement of the pistons 38, an exact measured quantity of the free flowing plastic or mastic is injected into the battery. With the side outlet ports 43, the material flows down into the outer cover tray section 24 and the walls 42 prevent the spraying of the plate groups with the plastic and the loss of the plastic. The material flows over and completely envelops the jump or connector straps 20 and partially envelops the inner ends of the terminal posts 21 and 22. This material flows entirely over the inner surface of the outer cover section and combines therewith and with adjacent portions of the battery case or container 10. This material is of a type which is compatible to the material forming the outer cover section 24 and the battery case or container so that the same will unite therewith and actually form a homogeneous part thereof. As the material solidifies, the same functions to insulate the connector or jump straps 22 and to effectively seal the terminal posts 21 and 22 and cover and this material also functions to form supports therefor. As the battery is lifted off of the nipples or nozzles 32, the edges of the walls of the sleeves 30 wipe access material off of the nozzles or nipples. When the material in the tray solidifies then the battery can be turned to its upright position and is ready to be placed upon the market.

When the material solidifies, the same actually forms an inner cover section which thickness the outer cover section and forms a continuation thereof, as heretofore set forth.

From the foregoing description, it can be seen that I have provided an effective and efficient means for injecting fluid plastic into the individual cells of a battery for reinforcing the outer battery cover and for effectively uniting a battery cover with its container. At this time, it is to be noted that the partitions 12 of the battery container extend into the plastic forming the inner cover section and that this plastic material combines with the partitions and effectively seals one cell from the other. It is also to be noted that the sleeves 30 function as dams to prevent the flow of the plastic material out of the battery.

Changes in details may be made without departing from the spirit or the scope of this invention, but what I claim as new is:

1. The method of forming a storage battery which consists in pre-molding a battery container with cell partitions extending to the upper edge thereof; second, pre-molding an outer cover section having a finished appearance and provided with a top wall and depending flanges; third, placing cell plate groups in the battery case with the groups connected by connector straps extending over the partitions; fourth, placing the pre-molded outer cover section on the case and in engagement with the connector straps; fifth, inverting the entire battery and finally, injecting a plastic material compatible with the case and the outer pre-molded cover section to an exact depth over the entire inner surface of the outer cover section to increase the thickness of the cover section and to combine with the outer cover section and the case and its partitions and over the connector straps.

2. The method of forming a storage battery which consists in pre-molding a casing having transversely extending spaced cell partitions with the partitions terminating at the upper edge of the case; second, pre-molding an outer cover section having a finished appearance and provided with a top wall and depending flanges with the top wall having seats on its inner face; third, placing cell plate groups in the case with the groups connected by flat connector straps extending over the partitions; fourth, placing the pre-molded outer cover section on the case with the connector straps fitted snugly in the seats; fifth, inverting the complete battery; sixth, injecting a plastic material in a free flowing state into the outer pre-molded cover section while the battery is in its inverted position to an exact predetermined depth over the entire inner surface of the outer section and over the connector straps and around the partition walls, and finally, returning the battery to its upright normal position with the cover uppermost upon the solidifying of the material.

3. The method of forming a storage battery which consists in pre-molding a case having transversely extending cell partitions; second, pre-molding an outer cover section having a finished appearance and provided with a top wall and depending flanges and with the top wall having depressed seats in its inner surface and with the top wall having openings for battery terminal posts and inwardly projecting sleeves opening out through the cover section to form vent and filling openings for the cells; third, placing assembled cell plate groups in the battery with the groups connected by flat connector straps extending over the cell partitions and with end groups having terminal posts; fourth, placing the pre-molded outer cover section on the case with the connector straps in the seats and the terminal posts through the openings; fifth, inverting the entire battery; sixth, placing injection nipples through the sleeves with the nipples extending beyond the sleeves; seventh, forcing an exact measured quantity of a plastic material in a fluid state through each nipple to cover the entire inner face of the outer cover section around the partitions, terminal posts and connector straps, and eight, removing the battery from the nipples and turning the same to its normal upright position with the cover uppermost upon the solidifying of the plastic material.

4. The method of forming a storage battery as defined in claim 3, and said nipples having closed inner ends and side outlet ports.

References Cited by the Examiner

UNITED STATES PATENTS

| | | | |
|---|---|---|---|
| 2,028,564 | 1/1936 | Robinson et al. | 264—272 X |
| 3,009,985 | 11/1961 | Trussell | 264—272 X |
| 3,194,867 | 7/1965 | Shannon | 264—263 X |

ROBERT F. WHITE, *Primary Examiner.*

L. S. SQUIRES, *Assistant Examiner.*